UNITED STATES PATENT OFFICE.

GEORGE SWEANOR, OF KINGSTON, TERRITORY OF NEW MEXICO.

ART OF SEPARATING GOLD FROM QUARTZ OR GANGUE.

SPECIFICATION forming part of Letters Patent No. 394,225, dated December 11, 1888.

Application filed August 25, 1887. Serial No. 247,831. (No model.)

*To all whom it may concern:*

Be it known that I, GEORGE SWEANOR, a citizen of the United States, residing in the town of Kingston, county of Sierra, Territory of New Mexico, have made a certain new and useful discovery relating to the Art of Separating Gold from Quartz or Gangue, of which the following is a full, clear, and exact description.

In my application for Letters Patent of the United States for method of separating metals from quartz or gangue, filed in the United States Patent Office May 16, 1887, and there given Serial No. 238,313, I state that I have discovered that when finely-pulverized quartz containing metal is placed in a vessel containing water and a liquid insoluble in water, and which is also of greater density than water, the quartz, although of greater density than the insoluble liquid, will float on the surface of the insoluble liquid at the bottom of the water, while whatever metal was previously mixed with the quartz precipitates through the insoluble liquid to the bottom of the vessel.

My present application relates to certain properties which I have discovered exist in a certain metallic compound under certain conditions, which enable me to use this compound to accomplish the purposes of a liquid insoluble in water, and of greater density than water, referred to in my said application, Serial No. 238,313. This certain metallic compound is made of four parts of bismuth, two parts of lead, one part of tin, and one part of cadmium fused together at a temperature of about 600° Fahrenheit. This is the metallic compound which forms the basis of my present discovery. It is readily fusible at a low temperature and will liquefy at about 190° Fahrenheit. I have discovered that this metallic compound will not combine with gold, and that in a liquid state it will permit particles of gold to drop through it to the bottom of a vessel in which it is contained, and that it will sustain on its surface the finely-crushed quartz or gangue. I have utilized this discovery by placing this metallic compound in any suitable tank or vessel, keeping this metallic compound in a liquid state by heating it to 190° Fahrenheit, or thereabout, and pouring finely-crushed quartz containing gold upon or into this metallic compound in a liquid state, whereupon the crushed quartz floats on the surface, and the gold particles are deposited through this metallic compound to the bottom of the tank or vessel.

I claim—

The method herein described of separating gold from quartz or gangue, which consists of placing a metallic compound made of four parts bismuth, two parts lead, one part tin, and one part cadmium, fused together at a temperature of about 600° Fahrenheit, into a tank or vessel in which the said metallic compound is kept liquefied at about 190° Fahrenheit, and pouring pulverized quartz containing gold onto or into the said metallic compound, whereby the gold is precipitated to the bottom of the tank or vessel and the pulverized quartz rises to the surface of the said metallic compound, substantially as described, and for the purpose specified.

In testimony whereof I have affixed my signature, in presence of two witnesses, this 20th day of August, 1887,

GEORGE SWEANOR.

Witnesses:
    PAUL BAKEWELL,
    S. L. SCHRADER.